United States Patent
Bajamahal (10) Patent No.: US 8,553,532 B2
(45) Date of Patent: Oct. 8, 2013

(54) METHODS AND APPARATUS FOR AVOIDING INTER-CHASSIS REDUNDANCY SWITCHOVER TO NON-FUNCTIONAL STANDBY NODES

(75) Inventor: Nageshwar Bajamahal, Santa Clara, CA (US)

(73) Assignee: Telefonaktiebolaget L M Ericsson (Publ), Stockholm (SE)

( * ) Notice: Subject to any disclaimer, the term of this patent is extended or adjusted under 35 U.S.C. 154(b) by 113 days.

(21) Appl. No.: 13/240,438

(22) Filed: Sep. 22, 2011

(65) Prior Publication Data

US 2013/0051219 A1    Feb. 28, 2013

Related U.S. Application Data

(60) Provisional application No. 61/526,426, filed on Aug. 23, 2011.

(51) Int. Cl.
*G01R 31/08* (2006.01)

(52) U.S. Cl.
USPC ........... 370/217; 370/225; 370/401; 370/242; 370/244; 709/238; 714/4.11

(58) Field of Classification Search
USPC ........................................ 709/238; 714/4.11
See application file for complete search history.

(56) References Cited

U.S. PATENT DOCUMENTS

| | | | | |
|---|---|---|---|---|
| 5,473,599 A * | 12/1995 | Li et al. | ......................... | 370/219 |
| 5,596,569 A * | 1/1997 | Madonna et al. | ............ | 370/217 |
| 7,590,886 B2 * | 9/2009 | Moscirella et al. | ............ | 714/13 |
| 7,640,451 B2 | 12/2009 | Meyer et al. | | |
| 2003/0005350 A1 * | 1/2003 | Koning et al. | .................... | 714/4 |
| 2003/0037165 A1 | 2/2003 | Shinomiya | | |
| 2007/0076591 A1 * | 4/2007 | Khan | ............................ | 370/216 |
| 2007/0076594 A1 * | 4/2007 | Khan et al. | .................... | 370/220 |
| 2007/0253328 A1 * | 11/2007 | Harper et al. | ................. | 370/219 |
| 2008/0181233 A1 | 7/2008 | Washam et al. | | |

* cited by examiner

*Primary Examiner* — Duc C Ho (57) ABSTRACT

A network node for routing messages in a communications system, includes at least one network interface that communicates messages with a plurality of other network nodes, and a microprocessor that sends and receives messages. The microprocessor transitions from operation in an active-with-peer state to operation in an active-without-peer state in response to detecting that a standby inter-chassis redundancy (ICR) node has become or will become at least partially non-functional as a backup message router for the network node. While operating in the active-with-peer state, the microprocessor responds to a switchover triggering event by switching-over at least part of its message routing responsibility to the standby ICR node. In contrast, while operating in an active-without-peer state, the microprocessor does not switchover routing responsibility to the standby ICR node in response to the switchover triggered event.

21 Claims, 6 Drawing Sheets

METHODS AND APPARATUS FOR AVOIDING INTER-CHASSIS REDUNDANCY SWITCHOVER TO NON-FUNCTIONAL STANDBY NODES

CROSS REFERENCE TO RELATED APPLICATION

The present application claims priority to Provisional U.S. Patent Application No. 61/526,426, filed Aug. 23, 2011, the disclosure of which is incorporated herein by reference as if set forth fully herein.

TECHNICAL FIELD

Embodiments described herein relate generally to communication systems and, more particularly, to network systems that support inter-chassis redundancy.

BACKGROUND

The approaches described in this section could be pursued, but are not necessarily approaches that have been previously conceived or pursued. Therefore, unless otherwise indicated herein, the approaches described in this section are not prior art to claims in this application and any application claiming priority from this application, and are not admitted to be prior art by inclusion in this section.

Border Gateway Protocol (BGP) is a network path vector routing protocol for inter-autonomous system routing. The function of a BGP-enabled network node (a BGP host or peer) is to exchange network reachability information with other BGP-enabled network nodes. To exchange routing information, two BGP hosts first establish a BGP peering session by exchanging BGP OPEN messages. The BGP hosts then exchange their full routing tables. After this initial exchange, each BGP host sends to its BGP peer or peers only incremental updates for new, modified, and unavailable or withdrawn routes in one or more BGP UPDATE messages. A route is defined as a unit of information that pairs a network destination with the attributes of a network path to that destination. The attributes of the network path include, among other things, the network addresses (also referred to as address prefixes or just prefixes) of the computer systems along the path.

A BGP host stores information about the routes known to the BGP host in a Routing Information Base (RIB). Depending on the particular software implementation of BGP, a RIB may be represented by one or more routing tables. When more than one routing table represents a RIB, the routing tables may be logical subsets of information stored in the same physical storage space, or the routing tables may be stored in physically separate storage spaces.

As networks grow more complex and the number of BGP routes maintained by a particular network element increase, the consequences of a BGP host device, or the BGP process executing on the BGP host device, becoming non-functional are more severe. For example, in some scenarios, when a BGP host fails or otherwise become non-functional, the BGP host can lose all information about routes maintained by the non-functional BGP host. Thus, recovery of the non-functional BGP host may require retransmission of a large amount of route information from other BGP hosts and the re-computation of a large amount of network reachability information by the recovering BGP host. During the retransmission period, the non-functional BGP host cannot route network traffic. Therefore, vendors of network gear and their customers desire to overcome these limitations to improve network availability.

Inter-Chassis Redundancy (ICR) can provide high availability within a network by having one or more network nodes that can be switched to handle the services of another network node that has become non-functional. Typically, one network node functions as an active ICR node while another network node functions as a standby ICR node that is configured to take over at least some operations (e.g., traffic routing operations) of the active ICR node, through a process called "switchover." Switchover can be triggered by failure of a network link or component of the active ICR node and/or by a network operator (e.g., taking an active ICR node off-line to perform a software/hardware update or other maintenance). The active ICR node handles routing of IP network traffic until it becomes non-functional, at which time switchover occurs with the standby ICR node taking over at least some functionality that was performed by the non-functional ICR node (with the standby ICR node then becoming an active ICR node).

Although ICR service has been described in the context of the BGP routing protocol, it is not limited thereto and can be used in other L2 or L3 network protocols, such as Open Shortest Path First (OSPF).

When using routing protocols like BGP, the determination of ICR state (Active or Standby) is done based on the best path, i.e., whichever node the BGP network determines has the best path becomes the active ICR node and another node (e.g., having the next best path) becomes the standby ICR node.

Network service failures can arise because the active ICR node does not know the presence of the standby ICR node, due to the BGP router which is the immediate neighbor to the active ICR node suppressing communications relating to non-best paths. Consequently, the active ICR node does not know about the presence of other nodes associated with non-best paths (including the standby ICR node) who are advertising their presence using the BGP protocol. In contrast, the standby ICR node becomes aware of the presence of the active ICR node using the BGP protocol.

A separate ICR transport channel can be established between the active and standby ICR nodes, and the standby ICR node can send heartbeat messages to the active ICR node. The active ICR node can discover the presence of the standby ICR node through receipt of the heartbeat message from the standby ICR node. However, the active ICR node is not aware of any link failure issues with the standby ICR node, configuration changes to the standby ICR node, or other events that cause the standby ICR node to become non-functional. This is because the BGP neighbor router at the active ICR node suppresses any changes to advertisements to the active ICR node as long as the active ICR node has the best path in the network.

Consequently, the active ICR node does not know that the standby ICR node has become non-functional. Therefore, when a network operator attempts to perform a manual switchover or another event occurs that triggers a switchover from the active ICR node to the standby ICR node, the network traffic that is then forwarded to the standby ICR node (instead of to the active ICR node) may not be properly processed and forwarded by the standby ICR node and, thus, lead to network service failures. These failures can result in unacceptable network operations degradation and lost revenue.

SUMMARY

It is therefore an object to address at least some of the above mentioned disadvantages and/or to improve network service reliability. Various embodiments provide an active ICR node that prevents inter-chassis redundancy switchover to a standby ICR node whenever the standby ICR node has become or will become at least partially non-functional as a backup message router for the active ICR node. Preventing switchover to the non-functional standby ICR node can ensure that network traffic continues to be properly processed and forwarded and, thereby, avoid network service failures that may otherwise result if switchover were permitted.

Some embodiments are directed to a network node that routes messages in a communications system. The network node includes at least one network interface configured to communicate messages with a plurality of other network nodes, and a microprocessor connected to the at least one network interface to send and receive messages. The microprocessor is configured to transition from operation in an active-with-peer state to operation in an active-without-peer state in response to detecting that a standby ICR node has become or will become at least partially non-functional as a backup message router for the network node. While operating in the active-with-peer state, the microprocessor responds to a switchover triggering event by switching-over at least part of its message routing responsibility to the standby ICR node. In contrast, while operating in an active-without-peer state, the microprocessor does not switchover routing responsibility to the standby ICR node in response to the switchover triggered event.

The microprocessor of the network node may determine that the standby ICR node has become or will become at least partially non-functional as a backup message router for the network node in response to receiving a status message through the at least one network interface from the standby ICR node. Alternatively or additionally, the microprocessor may receive periodic heartbeat status messages through the at least one network interface from the standby ICR node, and determine that the standby ICR node has become or will become at least partially non-functional as a backup message router for the network node in response to not receiving one of the heartbeat status messages within a threshold time from having last received one of the heartbeat status messages.

Some other embodiments are directed to a standby ICR node that routes messages in a communications system. The standby ICR node includes at least one network interface configured to communicate messages with an active ICR node and a plurality of other network nodes, and a microprocessor connected to the at least one network interface to send and receive messages. The microprocessor detects occurrence of a standby failure event that indicates that the standby ICR node has become or will become at least partially non-functional as a backup message router for the active ICR node. The microprocessor controls the active ICR node to transition from operation in an active-with-peer state to operation in an active-without-peer state in response to the standby failure event. The microprocessor performs a switchover to take at least part of the message routing responsibility from the active ICR node when a switchover triggering event occurs at the active ICR node while it is operating in the active-with-peer state.

The microprocessor of the standby ICR node may detect that the standby failure event has occurred in response to at least one of: 1) failure of a communication path between the at least one network interface and at least one of the plurality of other network nodes; 2) detecting a problem with advertising a path to at least one of the plurality of other network nodes; and/or 3) receiving an off-line command message from an operator node instructing the standby ICR node to cease functioning as a backup message router for the active ICR node.

The standby ICR node may send a status message through the at least one network interface to the active ICR node in response to the standby failure event, where the status message indicates that the standby ICR node has become or will become at least partially non-functional as a backup message router for the active ICR node.

The standby ICR node may establish a dedicated ICR transport channel for communication between the standby ICR node and the active ICR node, and cease sending periodically heartbeat messages through the dedicated ICR transport channel to the active ICR node in response to the standby failure event.

Some other embodiments are directed to a method of providing ICR for message routing in a communication system using a standby ICR node that functions as a backup message router for an active ICR node. The method includes operating the active ICR node in an active-with-peer state during which the active ICR node responds to a switchover triggering event by switching-over at least part of its message routing responsibility to the standby ICR node. The method further includes detecting occurrence of a standby failure event that indicates that the standby ICR node has become or will become at least partially non-functional as a backup message router for the active ICR node. The method further includes responding to the standby failure event by transitioning the active ICR node from operation in the active-with-peer state to operation in an active-without-peer state during which the active ICR node prevents switchover of its routing responsibility to the standby ICR node when the switchover triggered event occurs.

Some other embodiments are directed to a method of providing ICR for message routing in a communication system using a standby ICR node that functions as a backup message router for an active ICR node. The method includes performing a switchover operation for the standby ICR node to take over at least part of the message routing responsibility from the active ICR node when a switchover triggering event occurs at the active ICR node while the active ICR node is operating in an active-with-peer state. The method further includes detecting occurrence of a standby failure event that indicates that the standby ICR node has become or will become at least partially non-functional as a backup message router for the active ICR node. The method further includes controlling the active ICR node to transition from operation in the active-with-peer state to operation in an active-without-peer state in response to the standby failure event. When operating in the active-without-peer state, the standby ICR node does not perform the switchover operation.

Other active ICR nodes, standby ICR nodes, and/or methods according to embodiments of the invention will be or become apparent to one with skill in the art upon review of the following drawings and detailed description. It is intended that all such additional active ICR nodes, standby ICR nodes, and/or methods be included within this description, be within the scope of the present invention, and be protected by the accompanying claims. Moreover, it is intended that all embodiments disclosed herein can be implemented separately or combined in any way and/or combination.

BRIEF DESCRIPTION OF THE DRAWINGS

The accompanying drawings, which are included to provide a further understanding of the disclosure and are incorporated in and constitute a part of this application, illustrate certain non-limiting embodiments of the invention. In the drawings.

DETAILED DESCRIPTION

The following detailed description discloses various non-limiting example embodiments of the invention. The invention can be embodied in many different forms and is not to be construed as limited to the embodiments set forth herein.

Figure 1:
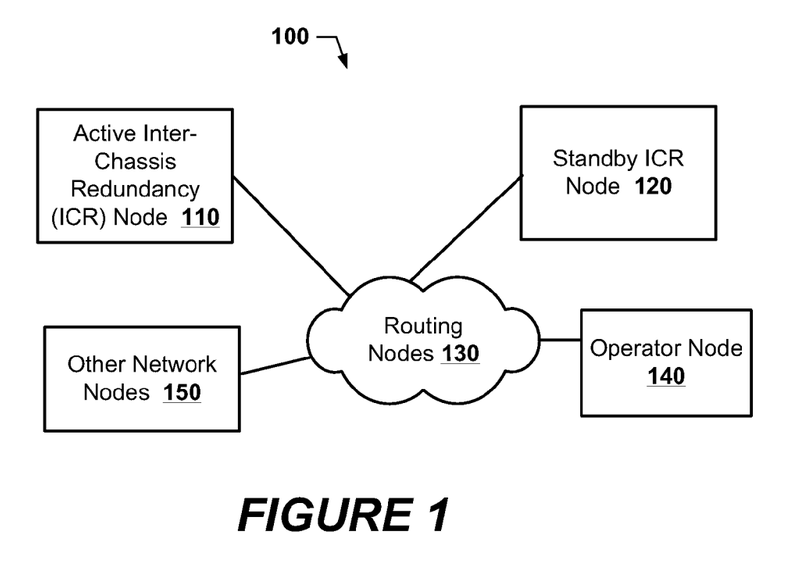
FIG. 1 illustrates a network system configured to provide Inter-Chassis Redundancy (ICR) in accordance with some embodiments.

Referring to FIG. 1, a network system 100 includes an active Inter-Chassis Redundancy (ICR) node 110 and at least one standby ICR node 120 that are interconnected through one or more intervening routing nodes 130. The standby ICR node 120 can takeover at least some of the routing responsibility over the active ICR node 110. When the active ICR node 110 becomes non-functional, the standby ICR node 120 can determine that the active ICR node 110 is no longer advertising routes (e.g., prefixes) and can respond to that determination by taking over advertisement of the routes (prefixes) that were previously being advertised by the active ICR node 110. Adjacent routing nodes 130 respond to the new route (prefix) advertisements by the standby ICR node 120 by now routing network traffic to the standby ICR node 120 instead of the active ICR node 110. Consequently, network traffic switches-over from the active ICR node 110 to the standby ICR 120, and the standby ICR 120 thereby functionally replaces the now non-functioning active ICR node 110.

In some embodiments, the standby ICR 120 can be configured as a hot-backup for the active ICR node 110, having some or all of the same route connection information as the active ICR node 110, so that network traffic can be more quickly switched over from being routed through the active ICR node 110 to instead being routed through the standby ICR node 120 in response to the active ICR node 110 becoming non-functional.

The network system 100 may include an operator node 140 that can be configured to control operation of the active ICR node 110 and the standby ICR node 120, and initiate switchover of network traffic from the active ICR node 110 to the standby ICR node 120. The operator node 140 may initiate switchover of network traffic from the active ICR node 110 to the standby ICR node 120 to, for example, enable a software/hardware update or other maintenance to be performed on the active ICR node 110 without interrupting routing of network traffic.

Various embodiments of the present invention are directed to avoiding switchover from the active ICR node 110 to the standby ICR node 120, for purposes of ICR, when the standby ICR node 120 has become non-functional. Various reasons that the standby ICR node 120 can become non-functional as an ICR backup for the active ICR node 110 can include, but are not limited to, failure of a communication network link of the standby ICR node 120 (e.g., communication path between the standby ICR node 120 and one or more of the routing nodes 130), configuration change(s) to the standby ICR node 120 that renders it non-functional for operation as an ICR backup for the active ICR node 110 (e.g., incapable of performing required operations or insufficient timeliness to perform required operations), failure of the standby ICR node 120 (e.g., hardware/software operational failure), and/or overloading of the standby ICR node 120 (e.g., when the standby ICR node 120 is also used as an active node for some other traffic routing) that renders it incapable of performing required operations or within insufficient timeliness to perform required operations to function as an ICR backup for the active ICR node 110.

In accordance with some embodiments, because BGP and other routing protocols would prevent discovery of the standby ICR node 120 by the active ICR node 110, and would further prevent communication of operational status (e.g., health) information from the standby ICR node 120 to the active ICR node 110, an ICR transport channel is setup as a dedicated communication channel between the standby ICR node 120 and the active ICR node 110. The ICR transport channel can be an Internet Protocol (IP) communication channel through the other nodes 130, and may use, for example, Transmission Control Protocol (TCP) or User Datagram Protocol (UDP) communications. The standby ICR node 120 is configured to repetitively send (e.g., periodically send) heartbeat status messages containing status (e.g., operational health) information to the active ICR node 110.

In accordance with some embodiments, the standby ICR node 120 is configured to determine when it has become non-functional for operation as an ICR backup for the active ICR node 110, and to respond to that determination by communicating a non-functional status message (e.g., link failure notification message) over the ICR transport channel (which may pass through the routing nodes 130) to the active ICR node 110 and/or by ceasing sending of heartbeat status messages through the ICR transport channel to the active ICR node 110 to signal its non-functional status.

Embodiment 1: Standby ICR Node Sends Non-Functional Status Message:

Referring to FIGS. 1-5, a dedicated ICR transport channel is established (block 202 of FIG. 2 and block 302 of FIG. 3) between the standby ICR node 120 and the active ICR node 110 for use in communicating heartbeat status messages and non-functional status messages from the standby ICR node 120 to the active ICR node 110.

Figure 2:
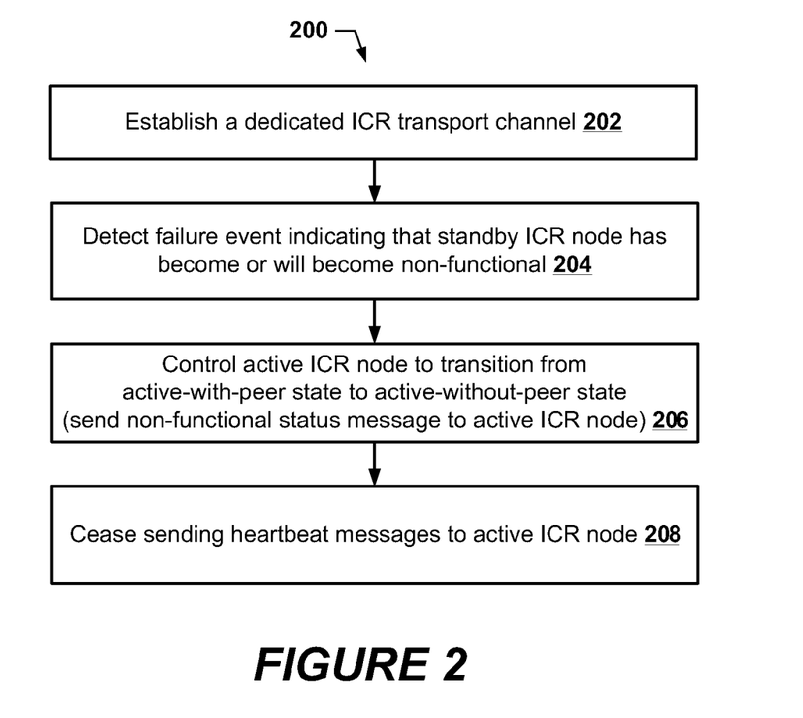
FIG. 2 is a flowchart of operations and methods that may be performed by the standby ICR node of FIG. 1 to control switchover according to a first embodiment.

The standby ICR node 120 detects (block 204) a failure event which indicates that it has become or will become non-functional as an ICR backup for the active ICR node 110. The failure event may, for example, be detected in response to receiving a defined message from the operator node 140 (e.g., an operator command to take the standby ICR node off-line to perform a software/hardware update or other maintenance), detecting a link failure or other problem with the standby ICR node 120 advertising its own routes (e.g., prefixes) to one or more other nodes 130, detecting failure of one or more components of the standby ICR node 120 (e.g., hardware/software operational failure), and/or other defined events.

The standby ICR node 120 responds to detection of the failure event by controlling the active ICR node 110 to transition from the active-with-peer state to the active-without-peer state. The standby ICR node 120 may control the active ICR node 110 to transition between these states by sending a notice message (block 206), which indicates its "non-functional" status, to the active ICR node 110 over the dedicated ICR transport channel. The standby ICR node 120 may also cease sending heartbeat status messages (block 208) to the active ICR node 110 through the dedicated ICR transport channel).

Figure 3:
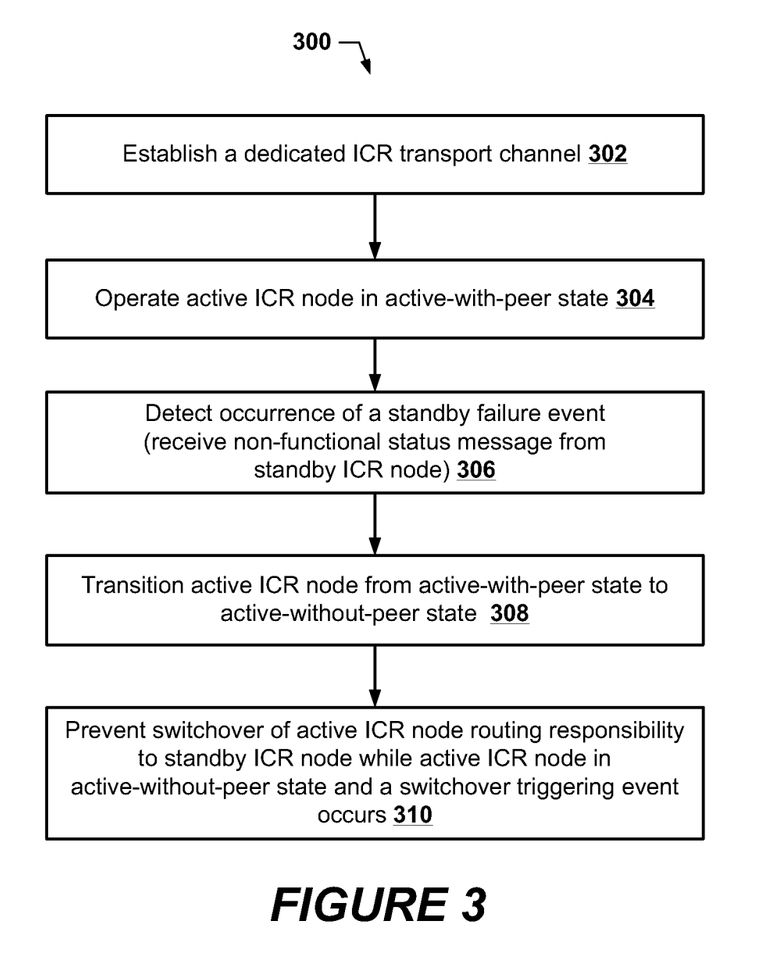
FIGS. 3 and 4 are flowcharts of operations and methods that may be performed by the active ICR node of FIG. 1 to control switchover according to the first embodiment.

Referring to the operations and methods 300 of FIG. 3 performed by the active ICR node 110, the active ICR node 110 is initially operating in the active-with-peer state (block 304). The active ICR node 110 detects occurrence of the failure event in response to receiving the notice message (block 306) indicating the standby ICR node's "non-functional" status. The active ICR node 110 responds to the detection by transitioning operational states (block 308) from the "Active-With-Peer" state to the "Active-Without-Peer" state. While in the "Active-Without-Peer" state, the active ICR node 110 is configured to prevent (block 310) switchover of the active ICR node 110 routing responsibility to the standby ICR node 120.

Figure 4:
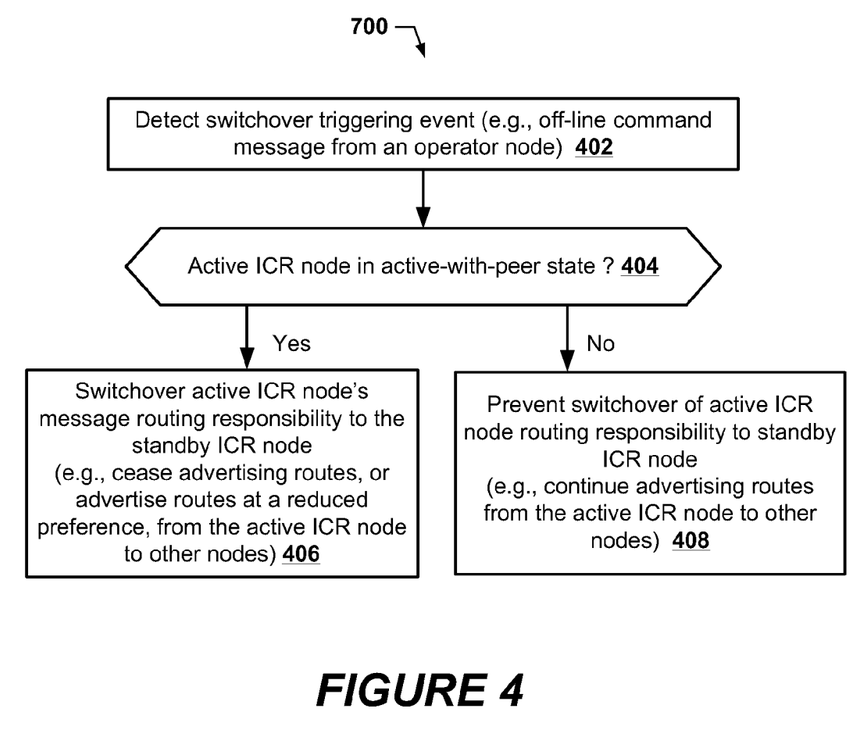

Further operations and methods 400 that may be performed by the standby ICR node 120 to control switchover according to the first embodiment are shown in FIG. 4. The active ICR node 110 detects (block 402) occurrence of a switchover triggering event. The switchover triggering event may be initiated by the operator node 140 (e.g., receipt of an off-line command message from the operator node 140) and/or may be initiated in response to detecting failure of a communication network link of the active ICR node 110 (e.g., communication path between the active ICR node 110 and one or more of the routing nodes 130), configuration change(s) to the active ICR node 110 that renders it non-functional for message routing (e.g., incapable of performing required operations or insufficient timeliness to perform required operations), failure of one or more components of the active ICR node 110 (e.g., hardware/software operational failure).

In response to detecting the switchover triggering event, the active ICR node 110 determines (block 404) whether it is operating in the active-with-peer state or the active-without-peer state. When operating in the active-with-peer state, the active ICR node 110 performs (block 406) a switchover operation to cause at least some, or all, of its message routing responsibility to be switched to the standby ICR node 120. The active ICR node 110 may perform the switchover operation by ceasing advertisement of its routes (e.g., prefixes), or advertise routes at a reduced preference, to at least some other nodes 130. In contrast, when the active ICR node 110 is operating in the active-without-peer state, the active ICR node 110 prevents (block 408) the switchover operation so that its message routing responsibility is not switched to the standby ICR node 120.

Preventing switchover when the standby ICR node 120 is not functional to takeover message routing for the active ICR node 110 causes the message routing to remain with the active ICR node 110 and, thereby avoids network service failures that may otherwise result if switchover were permitted.

Figure 5:
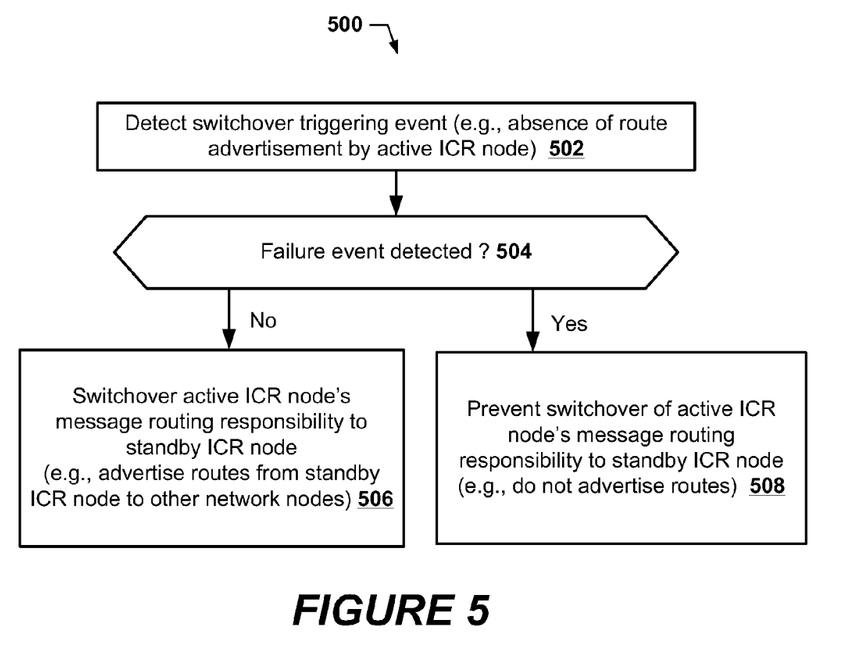
FIG. 5 is a flowchart of operations and methods that may be performed by the standby ICR node of FIG. 1 to control switchover according to a first embodiment.

Further operations and methods 500 that may be performed by the standby ICR node 120 to control switchover according to the first embodiment are shown in FIG. 5. The standby ICR node 120 detects a switchover triggering event (block 502), such as by detecting the absence of route advertisements by the active ICR node 110. The standby ICR node 120 determines (block 504) whether a failure event has been detected which would render the standby ICR node 120 non-functional for taking over at least some of the message routing responsibility of the active ICR node 110. When the failure event has not been detected, the standby ICR node 120 performs a switchover operation (block 506), such as by advertising its routes to at least some other network nodes 130, to cause switchover of at least some message routing responsibility from the active ICR node 110 to the standby ICR node 120. In contrast, when the failure event has been detected, the standby ICR node 120 prevents the switchover operation (block 508), such as by not advertising its routes to at least some other network nodes 130.

When the standby ICR node 120 again becomes available to serve as an ICR backup for the active ICR node 110, the standby ICR node 120 can resume sending heartbeat status messages to the active ICR node 120, and may send a status message indicating the standby ICR node's "functional" status. The active ICR node 110 can respond to receipt of a heartbeat status message and/or the status message (when available) from the standby ICR node 120 by transitioning from operating in the "active-without-peer" state to operating in the "active-with-peer" state. The active ICR node 110 may then resume advertising its routes to at least some nodes 130.

While in the "active-with-peer" state, the active ICR node 110 is configured to perform the switchover operation in response to controlled switchover events (e.g., initiated by the operator node 140) or non-controlled switchover events (e.g., initiated by a detected failure or other event rendering the active ICR node 110 non-functional) events so the standby ICR node 120 takes-over network routing responsibility for the active ICR node 110.

Figure 6:
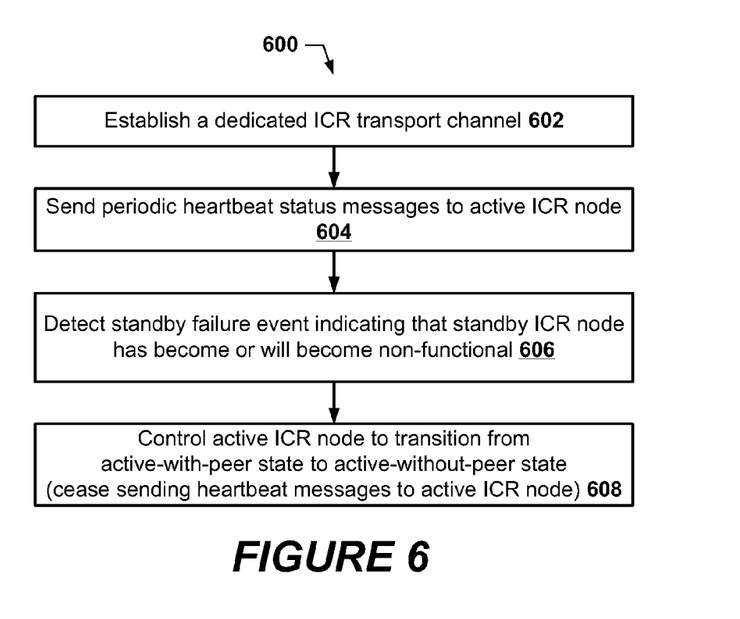
FIG. 6 is a flowchart of operations and methods that may be performed by the standby ICR node of FIG. 1 to control switchover according to a second embodiment.
Figure 7:
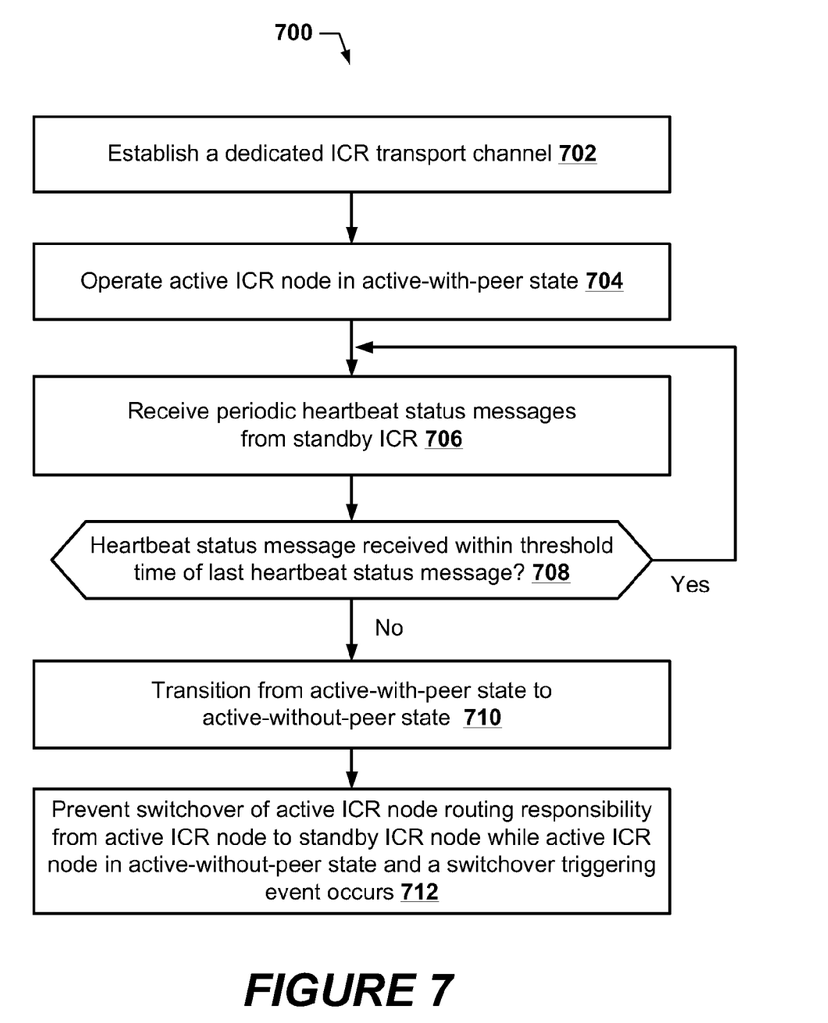
FIG. 7 is a flowchart of operations and methods that may be performed by the active ICR node of FIG. 1 to control switchover according to the second embodiment.

Embodiment 2 :Standby ICR Node Stops Heartbeat Status Messages:

Referring to FIGS. 1, 6 and 7, a dedicated ICR transport channel is established (block 602 of FIG. 6 and block 702 of FIG. 7) between the standby ICR node 120 and the active ICR node 110 for use in communicating heartbeat status messages from the standby ICR node 120 to the active ICR node 110. The standby ICR node 120 repetitively sends (e.g., periodically sends) heartbeat status messages (block 604) containing status (e.g., operational health) information to the active ICR node 110.

The standby ICR node 120 detects (block 606) a failure event which indicates that it has become or will become non-functional as an ICR backup for the active ICR node 110. The failure event may, for example, be detected in response to receiving a defined message from the operator node 140 (e.g., an operator command to take the standby ICR node off-line to perform a software/hardware update or other maintenance), detecting a link failure or other problem with the standby ICR node 120 advertising its own path to one or more other nodes 130, detecting failure of one or more components of the standby ICR node 120 (e.g., hardware/software operational failure), and/or other defined events.

The standby ICR node 120 responds to detection of the failure event by ceasing (block 608) its sending of the heartbeat status messages to the active ICR node 110 through the dedicated ICR transport channel, to cause the active ICR node 110 to transition from the active-with-peer state to the active-without-peer state.

The active ICR node 110, which has been receiving and monitoring (block 706 of FIG. 6) heartbeat status messages from the standby ICR node 120, detects absence of receipt of a last heartbeat status message from the standby ICR node 120 (block 708) within a threshold time (e.g., responsive to expiration of a peer loss detection timer). The active ICR node 110 responds to the detected absence of heartbeat status messages by transitioning operational states (block 710) from the "Active-With-Peer" state to the "Active-Without-Peer" state.

Again, while in the "Active-Without-Peer" state (block 712), the active ICR node 110 is configured to prevent (disable) switchover of its message routing responsibility to the standby ICR node 120. As explained above with regard to FIG. 4, when the active ICR node 110 detects (block 402) occurrence of a switchover triggering event and determines (block 404) that it is operating in the active-without-peer state, the active ICR node 110 prevents (block 408) the switchover operation so that the message routing responsibility of the active ICR node 110 is not switched to the standby ICR node 120. Preventing switchover when the standby ICR node 120 is not functional to takeover message routing for the active ICR node 110 causes the message routing to remain with the active ICR node 110 and, thereby avoids network service failures that may otherwise result if switchover were permitted.

When the standby ICR node 120 again becomes available to serve as an ICR backup for the active ICR node 110, the standby ICR node 120 can resume sending heartbeat status messages to the active ICR node 120. The active ICR node 110 can respond to receipt of a heartbeat status message from the standby ICR node 120 by transitioning from the "Active-Without-Peer" state back to the "Active-With-Peer" state, and may resume advertising its routes.

It is noted that because the active ICR node 110 needs to wait for expiration of a threshold time without receipt of a heartbeat status message from the standby ICR node 120, the active ICR node 110 may not detect the non-operational status of the standby ICR node 120 as quickly as may be provided in the first embodiment where the standby ICR node 120 proactively sent a non-functional status notification message to the active ICR node 110. Consequently, a window of time may occur between when the standby ICR node 120 becomes non-operational and the active ICR node 110 detects the non-operational status, and a switchover operation may undesirably be allowed to occur during that window and possibly result in network service failure. The network configuration provided by Embodiment 1 may therefore provide more robust avoidance of certain types of network system failures.

Figure 8:
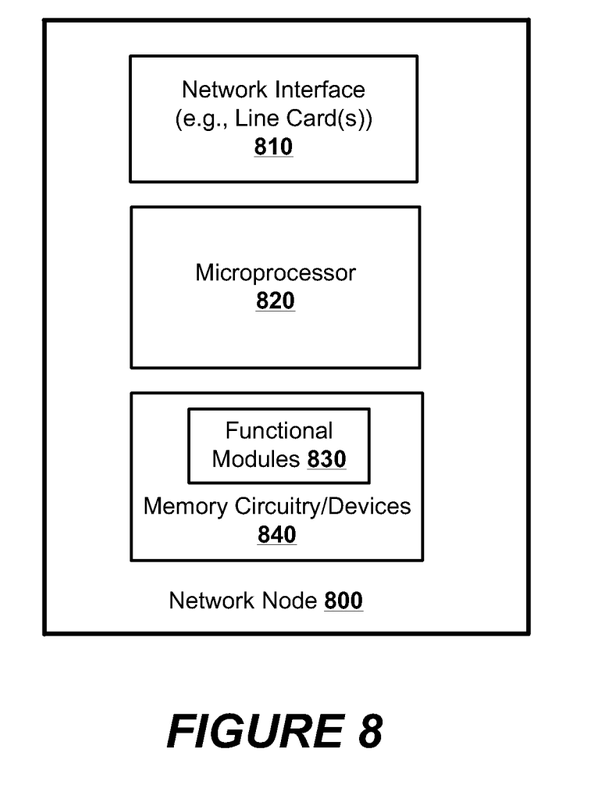
FIG. 8 is a block diagram of example components that may be included in the active ICR node, the standby ICR node, and/or other nodes of the network of FIG. 1 according to some embodiments.

Example Network Node:

FIG. 8 is a block diagram of example components that may be included in a network node 800 that may be incorporated in the active ICR node 110, the standby ICR node 120, and/or other nodes 130 of the network 100 of FIG. 1 according to some embodiments. Referring to FIG. 8, the network node 800 includes one or more network interfaces 810 (e.g., line card interfaces to other network nodes), one or more microprocessors 820, and memory circuitry/devices 840 that contain functional modules 830.

The microprocessor(s) 820 may include one or more data processing circuits, such as a general purpose and/or special purpose microprocessors (e.g., digital signal microprocessor). The microprocessor(s) 820 is configured to execute computer program instructions from the functional modules 830 in the memory circuitry/devices 840, described below as a computer readable medium, to perform some or all of the operations and methods that are described above for one or more of the embodiments, such as the embodiments of FIGS. 1-7.

The active and standby ICR nodes 110 and 120 may each host separate but duplicate instances of various software applications.

Further Definitions and Embodiments

In the above-description of various embodiments of the present invention, it is to be understood that the terminology used herein is for the purpose of describing particular embodiments only and is not intended to be limiting of the invention. Unless otherwise defined, all terms (including technical and scientific terms) used herein have the same meaning as commonly understood by one of ordinary skill in the art to which this invention belongs. It will be further understood that terms, such as those defined in commonly used dictionaries, should be interpreted as having a meaning that is consistent with their meaning in the context of this specification and the relevant art and will not be interpreted in an idealized or overly formal sense expressly so defined herein.

When a node is referred to as being "connected", "coupled", "responsive", or variants thereof to another node, it can be directly connected, coupled, or responsive to the other node or intervening nodes may be present. In contrast, when a node is referred to as being "directly connected", "directly coupled", "directly responsive", or variants thereof to another node, there are no intervening nodes present. Like numbers refer to like nodes throughout. Furthermore, "coupled", "connected", "responsive", or variants thereof as used herein may include wirelessly coupled, connected, or responsive. As used herein, the singular forms "a", "an" and "the" are intended to include the plural forms as well, unless the context clearly indicates otherwise. Well-known functions or constructions may not be described in detail for brevity and/or clarity. The term "and/or" includes any and all combinations of one or more of the associated listed items.

As used herein, the terms "comprise", "comprising", "comprises", "include", "including", "includes", "have", "has", "having", or variants thereof are open-ended, and include one or more stated features, integers, nodes, steps, components or functions but does not preclude the presence or addition of one or more other features, integers, nodes, steps, components, functions or groups thereof. Furthermore, as used herein, the common abbreviation "e.g.", which derives from the Latin phrase "exempli gratia," may be used to introduce or specify a general example or examples of a previously mentioned item, and is not intended to be limiting of such item. The common abbreviation "i.e.", which derives from the Latin phrase "id est," may be used to specify a particular item from a more general recitation.

Example embodiments are described herein with reference to block diagrams and/or flowchart illustrations of computer-implemented methods, apparatus (systems and/or devices) and/or computer program products. It is understood that a block of the block diagrams and/or flowchart illustrations, and combinations of blocks in the block diagrams and/or flowchart illustrations, can be implemented by computer program instructions that are performed by one or more computer circuits. These computer program instructions may be provided to a microprocessor of a general purpose computer circuit, special purpose computer circuit, and/or other programmable data processing circuit to produce a machine, such that the instructions, which execute via the microprocessor of the computer and/or other programmable data processing apparatus, transform and control transistors, values stored in memory locations, and other hardware components within such circuitry to implement the functions/acts specified in the block diagrams and/or flowchart block or blocks, and thereby create means (functionality) and/or structure for implementing the functions/acts specified in the block diagrams and/or flowchart block(s).

These computer program instructions may also be stored in a tangible computer-readable medium that can direct a computer or other programmable data processing apparatus to function in a particular manner, such that the instructions stored in the computer-readable medium produce an article of manufacture including instructions which implement the functions/acts specified in the block diagrams and/or flowchart block or blocks.

A tangible, non-transitory computer-readable medium may include an electronic, magnetic, optical, electromagnetic, or semiconductor data storage system, apparatus, or device. More specific examples of the computer-readable medium would include the following: a portable computer diskette, a random access memory (RAM) circuit, a read-only memory (ROM) circuit, an erasable programmable read-only memory (EPROM or Flash memory) circuit, a portable compact disc read-only memory (CD-ROM), and a portable digital video disc read-only memory (DVD/BlueRay).

The computer program instructions may also be loaded onto a computer and/or other programmable data processing apparatus to cause a series of operational steps to be performed on the computer and/or other programmable apparatus to produce a computer-implemented process such that the instructions which execute on the computer or other programmable apparatus provide steps for implementing the functions/acts specified in the block diagrams and/or flowchart block or blocks. Accordingly, embodiments of the present invention may be embodied in hardware and/or in software (including firmware, resident software, micro-code, etc.) that runs on a microprocessor such as a digital signal microprocessor, which may collectively be referred to as "circuitry," "a module" or variants thereof.

It should also be noted that in some alternate implementations, the functions/acts noted in the blocks may occur out of the order noted in the flowcharts. For example, two blocks shown in succession may in fact be executed substantially concurrently or the blocks may sometimes be executed in the reverse order, depending upon the functionality/acts involved. Moreover, the functionality of a given block of the flowcharts and/or block diagrams may be separated into multiple blocks and/or the functionality of two or more blocks of the flowcharts and/or block diagrams may be at least partially integrated. Finally, other blocks may be added/inserted between the blocks that are illustrated. Moreover, although some of the diagrams include arrows on communication paths to show a primary direction of communication, it is to be understood that communication may occur in the opposite direction to the depicted arrows.

Many different embodiments have been disclosed herein, in connection with the above description and the drawings. It will be understood that it would be unduly repetitious and obfuscating to literally describe and illustrate every combination and subcombination of these embodiments. Accordingly, the present specification, including the drawings, shall be construed to constitute a complete written description of various example combinations and subcombinations of embodiments and of the manner and process of making and using them, and shall support claims to any such combination or subcombination.

Many variations and modifications can be made to the embodiments without substantially departing from the principles of the present invention. All such variations and modifications are intended to be included herein within the scope of the present invention.

What is claimed:

1. A network node for routing messages in a communications system, the network node comprising:

at least one network interface configured to communicate messages with a plurality of other network nodes; and
a microprocessor connected to the at least one network interface to send and receive messages, and configured to:
operate in an active-with-peer state during which the microprocessor responds to a switchover triggering event by switching-over at least part of its message routing responsibility to a standby inter-chassis redundancy, ICR, node;
operate in an active-without-peer state during which the microprocessor does not switchover routing responsibility to the standby ICR node and maintains its routing responsibility in response to the switchover triggered event; and
transition from operation in the active-with-peer state to operation in the active-without-peer state in response to detecting that the standby ICR node has become or will become at least partially non-functional as a backup message router for the network node.

2. The network node of claim 1, wherein the microprocessor is further configured to:
transition from operation in the active-with-peer state to operation in the active-without-peer state in response to receiving a status message through the at least one network interface from the standby ICR node which indicates that the standby ICR node has become or will become at least partially non-functional as a backup message router for the network node.

3. The network node of claim 2, wherein the microprocessor is further configured to:
establish a dedicated ICR transport channel for communication between the network node and the standby ICR node; and
receive the status message through the dedicated ICR transport channel.

4. The network node of claim 1, wherein the microprocessor is further configured to:
receive periodic heartbeat status messages through the at least one network interface from the standby ICR node;
transition from operation in the active-with-peer state to operation in the active-without-peer state in response to not receiving one of the heartbeat status messages within a threshold time from having last received one of the heartbeat status messages.

5. The network node of claim 1, wherein the microprocessor is further configured to:
cease advertising routes or advertise routes at a reduced preference to the plurality of other network nodes in response to detecting the switchover triggering event while operating in the active-with-peer state, wherein the switchover triggering event indicates that the network node has become or will become at least partially non-functional for routing messages.

6. The network node of claim 5, wherein the microprocessor is further configured to:
receive an off-line command message from an operator node instructing the network node to cease routing messages;
while the network node is operating in the active-with-peer state, respond to the off-line command message by ceasing advertisement of routes to the plurality of other network nodes; and
while the network node is operating in the active-without-peer state, respond to the off-line command message by continuing to advertise routes to the plurality of other network nodes.

7. A standby inter-chassis redundancy, ICR, node for routing messages in a communications system, the standby ICR node comprising:
- at least one network interface configured to communicate messages with an active ICR node and a plurality of other network nodes; and
- a microprocessor connected to the at least one network interface to send and receive messages, and configured to:
  - detect occurrence of a standby failure event that indicates that the standby ICR node has become or will become at least partially non-functional as a backup message router for the active ICR node;
  - control the active ICR node to transition from operation in an active-with-peer state to operation in an active-without-peer state in response to the standby failure event, the active ICR node being configured to not switchover routing responsibility to the standby ICR node and maintain its routing responsibility when the active ICR node is in the active-without-peer state; and
  - perform a switchover to take at least part of the message routing responsibility from the active ICR node when a switchover triggering event occurs at the active ICR node while the active ICR node is operating in the active-with-peer state.

8. The standby ICR node of claim 7, wherein the microprocessor is further configured to:
- detect that the standby failure event has occurred in response to at least one of: 1) failure of a communication path between the at least one network interface and at least one of the plurality of other network nodes; 2) detecting a problem with advertising a path to at least one of the plurality of other network nodes; and/or 3) receiving an off-line command message from an operator node instructing the standby ICR node to cease functioning as a backup message router for the active ICR node.

9. The standby ICR node of claim 7, wherein the microprocessor is further configured to:
- send a status message through the at least one network interface to the active ICR node in response to the standby failure event, wherein the status message indicates that the standby ICR node has become or will become at least partially non-functional as a backup message router for the active ICR node.

10. The standby ICR node of claim 9, wherein the microprocessor is further configured to:
- establish a dedicated ICR transport channel for communication between the standby ICR node and the active ICR node; and
- send the status message through the dedicated ICR transport channel.

11. The standby ICR node of claim 7, wherein the microprocessor is further configured to:
- establish a dedicated ICR transport channel for communication between the standby ICR node and the active ICR node;
- send periodically heartbeat messages through the dedicated ICR transport channel to the active ICR node; and
- cease sending the periodically heartbeat messages through the dedicated ICR transport channel to the active ICR node in response to the standby failure event.

12. The standby ICR node of claim 7, wherein the microprocessor is further configured to:
- advertise routes from the standby ICR node to the other network nodes in response to determining that the active ICR node has ceased advertising routes to at least the standby network node while not detecting occurrence of the standby failure event.

13. A method of providing inter-chassis redundancy, ICR, for message routing in a communication system using a standby ICR node that functions as a backup message router for an active ICR node, the method comprising:
- operating the active ICR node in an active-with-peer state during which the active ICR node responds to a switchover triggering event by switching-over at least part of its message routing responsibility to the standby ICR node;
- detecting occurrence of a standby failure event that indicates that the standby ICR node has become or will become at least partially non-functional as a backup message router for the active ICR node;
- responding to the standby failure event by transitioning the active ICR node from operation in the active-with-peer state to operation in an active-without-peer state during which the active ICR node prevents switchover of its routing responsibility to the standby ICR node and maintains its routing responsibility when the switchover triggered event occurs.

14. The method of claim 13, further comprising:
- establishing a dedicated ICR transport channel for communication between the active ICR node and the standby ICR node,
- wherein detecting occurrence of the standby failure event comprises receiving a status message at the active ICR node from the standby ICR node through the dedicated IRC transport channel, the status message indicating that the standby ICR node has become or will become at least partially non-functional as a backup message router for the network node.

15. The method of claim 13, further comprising:
- establishing a dedicated ICR transport channel for communication between the active ICR node and the standby ICR node;
- receiving periodic heartbeat status messages at the active ICR node through the at least one network interface from the standby ICR node; and
- transitioning the active ICR node from operation in the active-with-peer state to operation in the active-without-peer state in response to not receiving one of the heartbeat status messages within a threshold time from having last received one of the heartbeat status messages.

16. The method of claim 13, further comprising:
- ceasing advertisement of routes from the active ICR node to at least some other nodes of the communication system in response to detecting the switchover triggering event while operating in the active-with-peer state, wherein the switchover triggering event indicates that the active ICR node has become or will become at least partially non-functional for routing messages.

17. The method of claim 16, further comprising:
- receiving an off-line command message from an operator node instructing the active ICR node to cease routing messages;
- while the active ICR node is operating in the active-with-peer state, responding to the off-line command message by ceasing advertisement of routes to the at least some other nodes; and
- while the active ICR node is operating in the active-without-peer state, responding to the off-line command message by continuing to advertise routes to the at least some other nodes.

18. A method of providing inter-chassis redundancy, ICR, for message routing in a communication system using a standby ICR node that functions as a backup message router for an active ICR node, the method comprising:
  performing a switchover operation for the standby ICR node to take over at least part of the message routing responsibility from the active ICR node when a switchover triggering event occurs at the active ICR node while the active ICR node is operating in an active-with-peer state;
  detecting occurrence of a standby failure event that indicates that the standby ICR node has become or will become at least partially non-functional as a backup message router for the active ICR node; and
  controlling the active ICR node to transition from operation in the active-with-peer state to operation in an active-without-peer state in response to the standby failure event, wherein when operating in the active-without-peer state the standby ICR node does not perform the switchover operation and the active ICR node maintains its routing responsibility.

19. The method of claim 18, further comprising:
  detecting at the standby ICR node that the standby failure event has occurred in response to at least one of: 1) failure of a path to another network node; 2) detecting a problem with advertising a path to another network; and/or 3) receiving an off-line command message from an operator node instructing the standby ICR node to cease functioning as a backup message router for the active ICR node.

20. The method of claim 18, further comprising:
  establishing a dedicated ICR transport channel for communication between the active ICR node and the standby ICR node,
  sending a status message from the standby ICR node to the active ICR node through the dedicated IRC transport channel in response to the standby failure event, the status message indicating that the standby ICR node has become or will become at least partially non-functional as a backup message router for the network node.

21. The method of claim 18, further comprising:
  establishing a dedicated ICR transport channel for communication between the active ICR node and the standby ICR node;
  sending periodic heartbeat status messages from the standby ICR node to the active ICR node through the dedicated IRC transport channel; and
  ceasing sending of the periodically heartbeat messages from the standby ICR node to the active ICR node in response to the standby failure event.

* * * * *

UNITED STATES PATENT AND TRADEMARK OFFICE
CERTIFICATE OF CORRECTION

PATENT NO.           : 8,553,532 B2             Page 1 of 2
APPLICATION NO.      : 13/240438
DATED                : October 8, 2013
INVENTOR(S)          : Bajamahal It is certified that error appears in the above-identified patent and that said Letters Patent is hereby corrected as shown below:

In the Drawings

In Fig. 3, Sheet 3 of 6, delete Tag "700", and insert -- 400 --, therefor.

In the Specifications

In Column 6, Line 34, delete "other nodes 130," and insert -- other routing nodes 130, --, therefor.

In Column 6, Line 67, delete "other nodes 130," and insert -- other routing nodes 130, --, therefor.

In Column 7, Lines 52-53, delete "other nodes 130." and insert -- other routing nodes 130. --, therefor.

In Column 8, Line 8, delete "other network nodes 130," and insert -- other network nodes 150, --, therefor.

In Column 8, Line 14, delete "other network nodes 130." and insert -- other network nodes 150. --, therefor.

In Column 8, Line 25, delete "some nodes 130." and insert -- some routing nodes 130. --, therefor.

In Column 8, Lines 53-54, delete "other nodes 130," and insert -- other routing nodes 130, --, therefor.

In Column 9, Line 49, delete "other nodes 130" and insert -- other routing nodes 130 --, therefor.

Signed and Sealed this
Fourth Day of February, 2014

Michelle K. Lee
*Deputy Director of the United States Patent and Trademark Office*

CERTIFICATE OF CORRECTION (continued)
U.S. Pat. No. 8,553,532 B2

In the Claims

In Column 14, Line 30, in Claim 14, delete "IRC" and insert -- ICR --, therefor.

In Column 16, Line 9, in Claim 20, delete "IRC" and insert -- ICR --, therefor.

In Column 16, Line 20, in Claim 21, delete "IRC" and insert -- ICR --, therefor.